United States Patent Office 3,748,266
Patented July 24, 1973

3,748,266
METHODS AND COMPOSITIONS FOR REDUCING FRICTIONAL PRESSURE LOSS IN THE FLOW OF HYDROCARBON LIQUIDS
William T. Malone, Marlin D. Holtmyer, John M. Tinsley, and Jiten Chatterji, Duncan, Okla., assignors to Halliburton Company, Duncan, Okla.
No Drawing. Continuation-in-part of abandoned application Ser. No. 878,578, Nov. 20, 1969. This application Nov. 1, 1971, Ser. No. 194,552
Int. Cl. F17d 1/14; E21b 43/26
U.S. Cl. 252—8.55 R
15 Claims

ABSTRACT OF THE DISCLOSURE

The present invention relates to methods and compositions for reducing the frictional pressure loss encountered in the turbulent flow of hydrocarbon liquids through a conduit. By the present invention a frictional pressure loss additive is intermixed with the hydrocarbon liquid, the additive being a homopolymer or a copolymer of the monomer

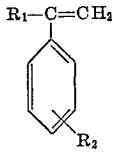

or copolymers of such monomer and certain styrene, acrylate or methacrylate type monomers.

CROSS-REFERENCE TO RELATED APPLICATIONS

This application is a continuation-in-part of application Ser. No. 878,578 filed Nov. 20, 1969, now abandoned, entitled "Additive to Reduce Frictional Pressure Loss in Hydrocarbon Fluids." Subject matter common to that contained in this application is also contained in application Ser. No. 113,677 filed Feb. 8, 1971, now abandoned, a division of application Ser. No. 878,578.

The present invention relates to the reduction of frictional pressure loss encountered in the transfer of liquids by fluid flow. It is well known that when a liquid is pumped or otherwise caused to flow through a conduit under pressure, energy is expended as a result of friction, and a frictional pressure loss results. Such frictional pressure losses are particularly large under turbulent flow conditions. That is, when the velocity of a liquid passing through a conduit is such that turbulent flow results, a large frictional pressure loss is encountered. This problem of high frictional pressure loss or pressure drop in the flow of liquids through a conduit is commonly encountered in industrial operations wherein hydrocarbon liquids are conveyed through pipelines at high fluid velocities. For example, hydrocarbon liquids, both in the pure state and in admixture with other hydrocarbon liquids and components including suspended solid materials, are commonly transferred over considerable distances by pipeline. In addition, in the hydraulic fracturing of subterranean well formations, hydrocarbon fracturing fluids such as kerosene or crude oil with and without propping agents suspended therein are commonly pumped through long strings of tubing or pipe at high velocities in order to cause fracturing of the formation.

In order to compensate for the frictional pressure loss encountered in the turbulent flow of such hydrocarbon liquids, considerable energy generally in the form of pumping horsepower must be expended. Thus, reduction of the frictional pressure loss in the flow of such hydrocarbon liquids brings about an advantageous reduction in horsepower requirements, or alternatively, an increased flow rate of the hydrocarbon liquids under the same pumping conditions.

Heretofore, various methods and additives for reducing the frictional pressure loss encountered in the flow of gasoline and other hydrocarbon liquids have been developed. For example, a method of reducing the friction loss in flowing hydrocarbon liquids utilizing polyisobutylene is described and claimed in U.S. Pat. No. 3,215,154. While polyisobutylene as a frictional pressure loss reducing additive has achieved general acceptable, it suffers from several significant shortcomings. For example, polyisobutylene can only be polymerized with cationic initiators under cryogenic conditions using a low boiling solvent as a reaction medium. When polymerization is complete, the reaction medium is warmed to ambient temperatures which causes the solvent to evaporate leaving only the solid polymer. Dissolution of the solid polyisobutylene polymer is difficult and generally requires a large expenditure of time, heat and mechanical energy. When an additive concentrate prepared by dissolving the polyisobutylene resin in kerosene or other suitable liquid is utilized, the concentrate is generally limited to a maximum polymer content of from about 3% to 4% by weight due to the slow rate of solution of the polymer. In addition, polyisobutylene is extremely sensitive to shear and as a result, rapidly loses its ability to reduce fractional pressure loss in the turbulent flow of hydrocarbon liquids. Yet another shortcoming of polyisobutylene is its low degree of compatibility with water, i.e., if the hydrocarbon liquid to which polyisobutylene is added contains dissolved water, the friction reduction capability of polyisobutylene is reduced.

By the present invention, a small amount of a novel friction reducing additive, generally less than 0.3% by weight, is intermixed with a hydrocarbon liquid. The resulting mixture is flowed through a conduit at turbulent flow conditions with only a relatively small fractional pressure loss being encountered.

Broadly described, the friction reducing additive of the present invention is a polymer selected from the group consisting of:

(a) Homopolymers and copolymers of the monomer

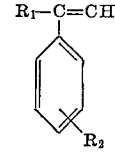

(b) Copolymers of the monomers

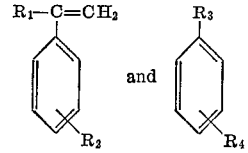

(c) Copolymers of the monomers

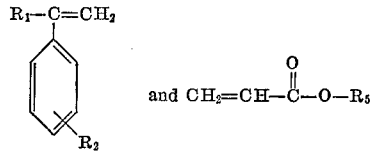

(d) Copolymers of the monomers

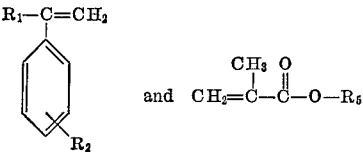

where $R_1$ is H or $CH_3$
$R_2$ is an alkyl radical having from 3 to 10 carbon atoms,
$R_3$ is $-CH=CH_2$ or

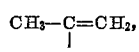

$R_4$ is $-H$ or an alkyl radical having from 1 to 2 carbon atoms,
$R_5$ is an alkyl radical having 1 to 3 carbon atoms, at least 25% of the total weight of any of said copolymers being defined by the radical

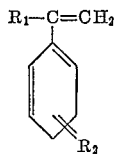

and said polymer having an intrinsic viscosity in toluene of at least about 2 dl./g. at 25° C.

Examples of suitable monomers which may be utilized to form the polymer additives of the present invention are as follows:

para n-propyl styrene
meta i-propyl styrene
para n-butyl styrene
para i-butyl styrene
para s-butyl styrene
para t-butyl styrene
para 2-ethylbutyl styrene
para n-hexyl styrene
para 2-ethylhexyl styrene
para n-octyl styrene
para n-decyl styrene
para isodecyl styrene "Frictional pressure loss" is used herein to mean the loss or drop in pressure due to friction encountered in the flow of fluid through a conduit at a given velocity. Generally, frictional pressure loss is measured by the difference in pressure between two points in a conduit through which the liquid is flowing divided by the distance between such points. As used herein, the "reduction in frictional pressure loss" brought about by a particular friction reducing agent or additive is defined as the decrease in the differential pressure required to move the same fluid through a conduit over a unit of length at the same velocity.

By the present invention a polymer additive is provided which, when intermixed with a hydrocarbon liquid and the mixture flowed through a conduit, brings about superior reduction in frictional pressure loss.

The degree of polymerization of the polymer additive of the present invention must be such that the polymer exhibits viscolastic properties and yet is soluble in the hydrocarbon liquid at the required concentration. This requires a relatively high molecular weight, for example, a molecular weight of about 1,000,000 or greater. The degree of polymerization of the additives of the present invention is expressed herein in terms of intrinsic viscosity, i.e., an intrinsic viscosity in a good solvent of at least about 2 dl./g. at 25° C. is required. By a good solvent is meant one which actually solvates the molecule, that is, the polymer and solvent are in greatest contact with the polymer parts contacting the solvent and not the polymer. Toluene has been found to be a good solvent for the polymers herein described. The determination of the intrinsic viscosity and the selection of suitable solvents, however, is readily within the ability of those skilled in the art, and accordingly a further description is not given herein.

The polymers of the present invention are preferably polymerized to the degree that the intrinsic viscosity at 25° C. in toluene is from about 2 to about 10 dl./g. The upper limit, however, may vary significantly depending upon the particular polymer since the upper limit is controlled primarily by the solubility of the polymer in the hydrocarbon liquid.

As indicated previously, the novel polymer additives of the present invention may be homopolymers and copolymers of the monomer

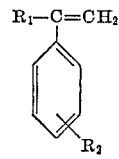

wherein $R_1$ is H or $CH_3$, and
$R_2$ is an alkyl radical having from 3 to 10 carbon atoms.

Additionally, copolymers produced from the above monomer and other monomers may be used, as long as the

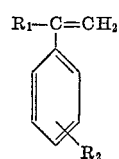

monomer is at least 25%, preferably at least 50% by weight of the total weight of the copolymer. Suitable other such monomers are

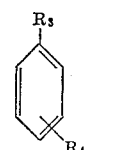

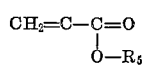

and

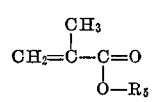

wherein $R_3$ is $-CH=CH_2$ or

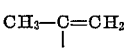

$R_4$ is H or an alkyl radical of 1 to 2 carbon atoms, and
$R_5$ is an alkyl radical having from 1 to 3 carbon atoms.

A remarkably low concentration of the polymer additives of the present invention produce superior reduction in the frictional pressure loss of hydrocarbon liquids in turbulent flow. In hydrocarbon liquids such as gasoline, kerosene and crude oil, for example, concentrations of from about 0.25 to 20 pounds of additive per 1000 gallons of hydrocarbon liquid produce superior reductions in frictional pressure loss. However, the concentration of the polymer additives is preferably maintained at between 1 to 10 pounds per 1000 gallons of hydrocarbon liquid with a concentration of from about 1 to about 4 pounds of additive per 1000 gallons of hydrocarbon liquid being most preferred.

Below a polymer additive concentration in a hydrocarbon liquid of about 0.25 pound per 1000 gallons of liquid (approximately .004 weight percent) insufficient additive is present to effectively bring about a reduction in friction pressure loss. The optimum quantity of polymer required will vary somewhat depending upon the molecular weight of the polymer used and the type of hydrocarbon liquid involved. In use of the polymer additive with hydrocarbon fracturing fluids, concentrations of from about 1 to about 4 pounds of additive per 1000 gallons of hydrocarbon fracturing fluid have been founnd to produce especially satisfactory results. However, when the polymer additive is used with a well-treating fluid containing sand or other solid agent suspended therein, it is preferable to use a somewhat larger amount of the polymer additive in the range of from about 1 to about 10 pounds per 1000 gallons. Under other conditions still higher concentrations of the additive up to about 20 pounds per 1000 gallons are useful. However, at concentrations of the additive above about 20 pounds per 1000 gallons of hydrocarbon liquid the viscosity of the treated liquid increases to the extent that it is detrimental to friction reduction.

The polymer additives of this invention have been found to exhibit excellent shear stability, that is, the additives are relatively insensitive to the effects of shear produced by the turbulent flow. Stated another way, the excellent shear stability of the polymer additives of the present invention brings about a reduction in frictional pressure loss which decreases less in time than the frictional pressure loss reduction produced by additives used heretofore, such as polyisobutylene.

The polymer additives of the present invention are preferably prepared by standard emulsion polymerization techniques. Standard recipes for emulsion polymerization include four principal ingredients, namely, the monomer to be polymerized, water or mixtures of water and alcohol (the continuous phase), an emulsifier, and an initiator. In addition, certain reducing agents such as sodium bisulfite may be used to increase the rate of initiator dissociation and to reduce the inhibition period. Emulsifiers which may be used include sodium laurylsulfate, potassium laurate and potassium stearate. Suitable initiators include potassium persulfate, ammonium persulfate, cumyl hydroperoxide and other water soluble organic peroxides and hydroperoxides. Other agents may also be used and in place of sodium bisulfite, water soluble salts of iron (II), copper (I), chromium (II), cobalt (II), vanadium (II), and titanium (III) may be used.

As an example of the preparation of the polymers, the laboratory procedure for the emulsion polymerization of tertiary butyl styrene monomer is as follows:

A round bottom flask fitted with a suitable stirrer, a gas inlet, and a Liebig condenser with a gas outlet, is flushed with nitrogen or argon to remove atmospheric oxygen. The flask is then charged with the following ingredients in the following order: (1) emulsifier, initiator and reducing agent; (2) continuous phase; and (3) the monomer. The reaction vessel is subjected to a constant temperature, usually 50° to 60° C. Throughout the course of the reaction, the system is continuously flushed with an inert gas such as nitrogen or argon. The reaction runs for a period of from three to six hours at which time the tertiary butyl styrene polymer latex may be coagulated and removed by the addition of an emulsion breaker such as methanol or isopropanol to the reaction product, followed by filtration and drying under vacuum.

In the practice of this invention, a polymer additive having a molecular weight of about 1,000,000 or greater, i.e., an intrinsic viscosity in toluene at 25° C. of at least 2 dl./g., and preferably in the range of about from 2 to about 10 dl./g., is intermixed with a hydrocarbon liquid in an amount of at least 0.25 pound per 1000 gallons of hydrocarbon liquid. The polymer additive may be intermixed with the hydrocarbon fluid directly or the additive may be predissolved in a concentrate which may be intermixed with the hydocarrbon liquid. While the polymer additive may be produced in the solid state and then dissolved in the hydrocarbon liquid or in a suitable concentrate liquid, the preferred method of intermixing the polymer additive with a hydrocarbon fluid is to add the polymer in the emulsified state as produced by the emulsion polymerization reaction. As is understood by those skilled in the art, the product from an emulsion polymerization reaction is a liquid, i.e., the polymer is dispersed in the continuous phase in the form of an emulsion. By the present invention, the polymer in this emulsified state is intermixed directly with the hydrocarbon liquid and an emulsion breaker is simultaneously added thereto. As the emulsion is broken by the emulsion breaker, the minute polymer particles originally dispersed in the emulsion are rapidly dissolved in the hydrocarbon liquid. Suitable emulsion breakers which may be usde are low molecular weight alkanols such as methanol, ethanol or isopropanol, and commercially available cationic surface active agents.

The polymer additives of the present invention are preferably predissolved in kerosene or other suitable hydrocarbon liquid to form an additive concentrate. The dissolution of the polymer in the concentrate solvent is carried out as described above, i.e., the polymer in emulsion form is added to the solvent along with an emulsion breaker. The concentration of the polymer in the concentrate may vary depending on the molecular weight of the polymer. However, if the concentration of the polymer is increased to too high a level, the resulting concentrate solution may be too viscous to be handled easily. Generally a polymer concentration of up to about 10% by weight in the concentrate is suitable.

The friciton reduction additive concentrate may be continuously intermixed or batch-mixed with the hydrocarbon fluid to be treated. Once the additive is combined with the hydrocarbon fluid it is pumped or otherwise caused to flow through a conduit at turbulent flow conditions with superior reduction in frictional pressure loss being obtained.

As an example of the preparation of a polymer additive concentrate of this invention, a mixing tank is charged with 1000 gallons of kerosene. Then, a quantity of a poly (tertiary butyl styrene) emulsion product from an emulsion polymerization reaction, the poly(tertiary butyl styrene) having an intrinsic viscosity at 25° C. in toluene of 8 dl./g., is added to the kerosene along with sufficient isopropyl alcohol to break the emulsion. The mixture is stirred to insure the intermixing of the kerosene, polymer emulsion and alcohol. As soon as sufficient polymer has been added to the kerosene to produce a concentration of 5.3% by weight of the polymer in the kerosene (a total of approximately 150 gallons of emulsion) along with sufficient isopropyl alcohol to break the emulsion (approximately 145 gallons) the stirring is discontinued. The resulting concentrate may be stored for an indefinite period of time without visible detrimental effects.

As an example of a particularly effective embodiment of this invention for the hydraulic fracturing of a subterranean well formation, a quantity of the poly(tertiary butyl styrene) concentrate prepared as described above equal to 10 gallons per 1000 gallons of fracturing fluid to be used is provided at the well site. After the well formation to be fractured is preconditioned in a conventional manner, a kerosene fracturing fluid having conventional solid propping agent suspended therein and a concentration of 4.8 pounds of polymer per 1000 gallons, is pumped into the well formation through 5000 feet of standard 1.995 inch I.D. tubing. The kerosene fracturing fluid is pumped at a rate of 14 barrels per minute at a surface pressure of 4500 p.s.i.g. subjecting the formation to a fracturing pressure of 3800 p.s.i. The absence of the polymer additive in the kerosene fracturing fluid results in a surface pressure of 14,500 p.s.i.g. under identical well conditions. This in turn requires an additional 3440 hydraulic horsepower.

The term "hydrocarbon liquid" as used herein refers to those hydrocarbon compounds and mixtures thereof, with or without solids suspended therein and containing other conventional additives, which are in the liquid state at atmospheric conditions, have a viscosity such that they are pumpable and have sufficient solvency for the polymers of the present invention to dissolve desired quantities thereof. Such hydrocarbon liquids include petroleum products such as crude oil, gasoline, kerosene and fuel oil as well as straight and branched chain paraffin hydrocarbons, cyclo-paraffin hydrocarbons, mono-olefin hydrocarbons, di-olefin hydrocarbons, alkene hydrocarbons and aromatic hydrocarbons such as benzene, toluene and xylene.

As previously stated, this invention relates to methods and compositions for reducing the frictional pressure loss of a hydrocarbon liquid moved through a conduit under turbulent flow conditions. Turbulent flow conditions are well understood by those skilled in the art and a detailed discussion is not given herein. However, turbulence causing an appreciable frictional pressure loss in hydrocarbon liquids which may be reduced by the intermixing of the polymer additives of the present invention with the hydrocarbon liquids results at flow rates which give a Reynolds number for the base hydrocarbon liquid above about 3000 as defined by the following relationship:

$$N_R = \frac{dv\rho^{1\,2}}{\mu}$$

[1] Reynolds, O., Proc. Manchester Lit. Phil. Loe., 8 (1874)
[2] Moody, L. F., Trans. ASME, 66, 671 (1944).

wherein:

$N_R$ = Reynolds number, Newtonian fluid
$d$ = inside diameter of pipe
$v$ = average flow velocity
$\rho$ = density of fluid
$\mu$ = absolute viscosity (Newtonian fluid)

In order to present a clear understanding of the frictional pressure loss reduction additives and methods of the present invention, the following examples are given. For convenience of discussion, the abbreviations for the polymers given in Table I below are used in the examples.

TABLE I

Abbreviations

| Polymer: | Abbrevation |
|---|---|
| Poly(n-propyl styrene) | nPS |
| Poly(isopropyl styrene) | iPS |
| Poly(n-butyl styrene) | nBS |
| Poly(isobutyl styrene) | iBS |
| Poly(sec-butyl styrene) | sBS |
| Poly(tertiary-butyl styrene) | tBS |
| Poly (tertiary-butyl styrene-co-styrene) | tBS-S |

In the examples which follow, friction reduction properties of the polymers listed in Table I are given. Friction reduction properties are determined by intermixing the polymers with a hydrocarbon liquid (kerosene) and pumping the liquid mixture from a container through a six-foot section of 3/8 inch pipe and back through the container. The pressure drop in the section of pipe is continuously measured and recorded on an X–Y plotter (a conventional device which records percent reduction on the Y axis and time on the X axis). The percent of reduction in friction pressure loss is measured both initially and after a period of time. A zero reading, established with only kerosene flowing through the pipe, on the X–Y plotter indicates no reduction in friction, and a 100 reading, established with no fluid flow, indicates no friction at all. Thus, the higher the reading on the X–Y plotter the more effective the polymer additive tested is in reduction of friction pressure loss. Each polymer tested is predissolved in kerosene and added at 60 seconds from the beginning of each test run. The intrinsic viscosity of each polymer tested is determined in a conventional manner.

Example 1

A polymer of tertiary butyl styrene having an intrinsic viscosity of 7.9 dl./g. at 25° C. in toluene is added to kerosene at a concentration of two pounds per 1000 gallons of kerosene. A maximum friction reduction of 64% results, and after 10 minutes, the friction reduction is 60%.

Example 2

The effect of concentration on friction reduction for tBS having a molecular weight of about 2,000,000 is as shown in Table II below.

TABLE II

Friction reduction properties of tBS at various concentrations in kerosene

| Concentration, lbs./1000 gal. kerosene: | Percent friction reduction |
|---|---|
| 10 | 64 |
| 5 | 61 |
| 2.5 | 63 |
| 1.25 | 61 |
| 0.625 | 56 |

Example 3

The effect of molecular weight with respect to friction reduction for different polymers of tBS at a concentration of four pounds per 1000 gallons of kerosene is shown in Table III.

TABLE III.—FRICTION REDUCTION PROPERTIES OF VARIOUS tBS POLYMERS AT A CONCENTRATION OF 4 POUNDS/1,000 GALLONS KEROSENE

| Molecular weight×10⁻⁶ | Percent friction reduction | Intrinsic viscosity,[1] dl./g. |
|---|---|---|
| 0.50 | 14 | 1.6 |
| 0.81 | 15 | 2.1 |
| 0.93 | 25 | 2.3 |
| 1.4 | 50 | 3.1 |
| 1.5 | 58 | 3.3 |
| 1.9 | 60 | 3.8 |
| 2.1 | 56 | 4.2 |
| 2.5 | 56 | 4.7 |
| 2.9 | 56 | 5.1 |
| 5.5 | 72 | 8.2 |

[1] At 25° C. in toluene.

Example 4

The effect of molecular weight on the friction reduction properties of various tBS polymers at a concentration of 2 pounds of polymer per 1000 gallons of kerosene is shown in Table IV below.

TABLE IV.—FRICTION REDUCTION PROPERTIES OF VARIOUS tBS POLYMERS AT A CONCENTRATION OF 2 POUNDS/1,000 GALLONS KEROSENE

| Molecular weight×10⁻⁶ | Percent friction reduction | Intrinsic viscosity,[1] dl./g. |
|---|---|---|
| 1.4 | 42 | 3.1 |
| 1.5 | 52 | 3.3 |
| 1.8 | 31 | 3.7 |
| 1.9 | 54 | 3.8 |
| 2.1 | 50 | 4.1 |
| 2.1 | 52 | 4.1 |
| 2.5 | 46 | 4.7 |
| 2.9 | 49 | 5.1 |
| 3.2 | 47 | 5.6 |
| 5.5 | 68 | 8.2 |

[1] At 25° C. in toluene.

From the foregoing it may be seen that with increasing polymer molecular weights increased reduction in frictional pressure loss is obtained.

Example 5

A polymer of nPS is prepared by emulsion polymerization using the following relative concentration of ingredients: water 40.0 grams, monomer 20.0 grams, emulsifier (sodium lauryl sulfate) 1.6 grams, initiator potassium persulfate 0.0030 gram and reducing agent sodium bisulfite 0.0030 gram. The reaction is carried out at 55° C. and results in a polymer with a molecular weight of $2.3 \times 10^6$ (an intrinsic viscosity of 4.4 dl./g. at 25° C. in toluene). The friction reduction properties of this polymer are shown in Table V below.

TABLE V

Friction reduction properties of nPS

| Concentration, lbs./1000 gal. kerosene: | Percent friction reduction |
|---|---|
| 2 | 24 |
| 4 | 32 |

Example 6

An iPS monomer is polymerized by the emulsion technique described in Example 5 using the identical level of ingredients and reaction conditions. The friction reduction properties of this polymer are shown in Table VI.

TABLE VI

Friction reduction properties of nPS

| Concentration, lbs./1000 gal. kerosene: | Percent friction reduction |
|---|---|
| 2 | 11 |
| 4 | 16 |

Example 7

An sBS polymer is made by the emulsion technique described in Example 5 using the identical level of ingredients and reaction conditions. The molecular weight is determined to be $1.2 \times 10^6$ (an intrinsic viscosity of 2.7 dl./g. at 25° C. in toluene). The friction reduction properties of this polymer are shown in Table VII below.

TABLE VII

Friction reduction properties of nBS

| Concentration, lbs./1000 gal. kerosene: | Percent friction reduction |
|---|---|
| 2 | 11 |
| 4 | 16 |

Example 8

An sBS polymer is made by the emulsion technique of Example 5 using the following level of ingredients: water 40.0 grams, monomer 20.0 grams, emulsifier (sodium lauryl sulfate) 1.6 grams, initiator (potassium persulfate) and reducing agent (sodium bisulfite) 0.0041 gram. The reaction is carried out at 60° C. The friction reduction properties of the polymer produce d are shown in Table VIII below.

TABLE VIII

Friction reduction properties of sBS

| Concention, lbs./1000 gal. Kerosene: | Percent friction reduction |
|---|---|
| 4 | 8 |

EXAMPLE 9

An iBS polymer is synthesized by the emulsion technique of Example 5 using the identical level of ingredients except that the initiator is at a level of 0.003 gram. The reaction is carried out at 60° C. The friction reduction properties of the polymer produced are shown in Table IX.

TABLE IX.—FRICTION REDUCTION PROPERTIES OF iBS

| Concentration, lbs./1,000 gal. kerosene | Percent friction reduction | Intrinsic viscosity,[1] dl./g. |
|---|---|---|
| 2 | 62 | 7.1 |
| 4 | 70 | 7.1 |

[1] At 25° C. in toluene.

EXAMPLE 10

The friction reduction properties of various polymer additives at various concentrations are given in Table X below.

TABLE X.—FRICTION REDUCTION PROPERTIES OF POLYMER ADDITIVES AT VARIOUS CONCENTRATIONS

| Polymer additive | Concentration, pounds additive/ 1,000 gallons kerosene | Percent friction reduction |
|---|---|---|
| tBS | 5 | 51 |
|  | 10 | 58 |
|  | 15 | 60 |
| tBS-S | 2 | 64 |
|  | 4 | 68 |
|  | 5 | 68 |
|  | 10 | 72 |
|  | 15 | 73 |

EXAMPLE 11

The friction reduction properties of polymer additives of the present invention are compared with those of commercially available polyisobutylene as follows:

TABLE XI.—FRICTION REDUCTION PROPERTIES OF POLYMER ADDITIVES COMPARED WITH POLYISOBUTYLENE

| Additive | Base fluid | Concentration, lbs./ 1,000 gal. | Percent friction reduction | | |
|---|---|---|---|---|---|
| | | | Initial | Final | Difference |
| Polyisobutylene | Kerosene | 4 | 75 | 37 | 38 |
| tBS | do | 4 | 72 | 53 | 19 |
| iBS | do | 4 | 68 | 57 | 11 |

As can be seen from the data given in Table XI, the polymer additives of this invention exhibit greater shear stability than polyisobutylene. In each of the comparative tests shown, polyisobutylene gave a greater decrease in percent friction reduction with time than tBS or iBS. Further, in each instance, the decrease is greater than two to three times the decrease when using tBS or iBS. Thus, polyisobutylene is considerably more sensitive to shear and is not as effective an additive to reduce frictional pressure loss as the polymer additives of this invention.

What is claimed is:

1. A hydraulic well fracturing fluid composition consisting essentially of a hydrocarbon liquid having dissolved therein from about 0.25 pound to about 10 pounds of an additive per 1000 gallons of said liquid, said additive being selected from the group consisting of:

(a) homopolymers and copolymers of the monomer

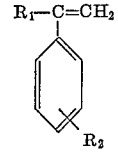

(b) copolymers of the monomers

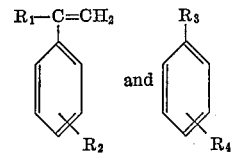

(c) copolymers of the monomers

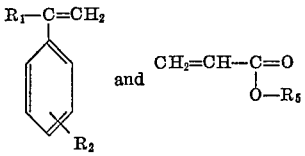

(d) copolymers of the monomers

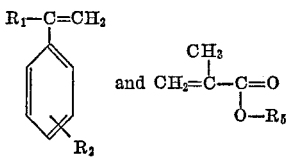 and $CH_2=C(CH_3)-C(=O)-O-R_5$ where
$R_1$ is H or $CH_3$,
$R_2$ is an alkyl radical having 3 to 10 carbon atoms,
$R_3$ is $-CH=CH_2$ or
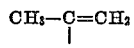
$R_4$ is H or an alkyl radical having from 1 to 2 carbon atoms, and
$R_5$ is an alkyl radical having 1 to 3 carbon atoms,
at least 25% of the total weight of any of said copolymers being defined by the radical

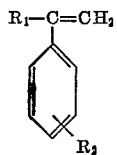

and said polymer having an intrinsic viscosity in toluene of at least about 2 dl./g. at 25° C.

2. The fracturing fluid composition of claim 1 wherein said additive is present therein in an amount of from about 1 pound to about 10 pounds per 1000 gallons of said hydrocarbon liquid.

3. The fracturing fluid composition of claim 1 wherein the intrinsic viscosity in toluene of said additive is from about 2 to about 10 dl./g.

4. The fracturing fluid composition of claim 3 wherein said hydrocarbon liquid is kerosene and said additive is poly(tertiary butyl styrene).

5. A method of reducing the frictional pressure loss encountered in the turbulent flow of a hydrocarbon liquid through a conduit comprising the steps of:
intermixing with said hydrocarbon liquid from about 0.25 pounds to about 20 pounds of an additive per 1000 gallons of said liquid, said additive being selected from the group consisting of:
(a) homopolymers and copolymers of the monomers

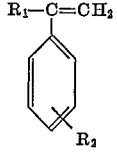

(b) copolymers of the monomers

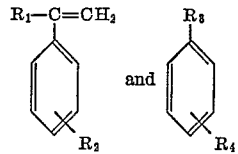

(c) copolymers of the monomers

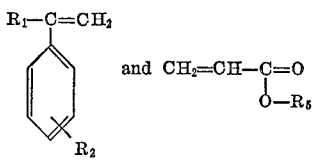

(d) copolymers of the monomers

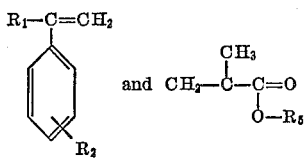 and $CH_2=C(CH_3)-C(=O)-O-R_5$ where
$R_1$ is H or $CH_3$,
$R_2$ is an alkyl radical having from 3 to 10 carbon atoms,
$R_3$ is $-CH=CH_2$ or
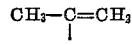
$R_4$ is H or an alkyl radical having from 1 to 2 carbon atoms, and
$R_5$ is an alkyl radical having 1 to 3 carbon atoms,
at least 25% of the total weight of any of said copolymers being defined by the radical

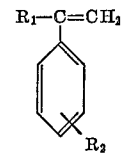

and said polymer having an intrinsic viscosity in toluene of at least about 2 dl./g. at 25° C.; and
flowing the resulting mixture through said conduit.

6. The method of claim 5 wherein said additive is intermixed with said hydrocarbon liquid in an amount of from about 1 pound to about 10 pounds per 1000 gallons of said liquid.

7. The method of claim 5 wherein said intrinsic viscosity of said additive is from about 2 to about 10 dl./g.

8. The method of claim 5 wherein said additive is intermixed with said hydrocarbon liquid as a concentrate, said concentrate containing up to about 10% of said additive by weight in a hydrocarbon solvent for said additive.

9. The method of claim 8 wherein said solvent is kerosene.

10. A method of hydraulically fracturing a subterranean well formation penetrated by a well bore having a conduit disposed therein which comprises:
pumping through said conduit and into said formation a hydrocarbon fracturing fluid having dissolved therein a frictional pressure loss reducing additive in an amount of from about 0.25 pound to about 20 pounds of additive per 1000 gallons of fracturing fluid, said additive being selected from the group consisting of:
(a) homopolymers and copolymers of the monomers

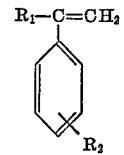

(b) copolymers of the monomers

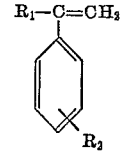

and

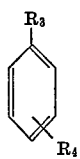

(c) copolymers of the monomers

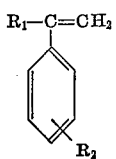

and

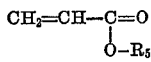

(d) copolymers of the monomers

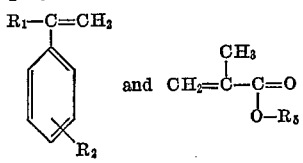

where $R_1$ is H or $CH_3$, $R_2$ is an alkyl radical having from 3 to 10 carbon atoms, $R_3$ is —CH=$CH_2$ or

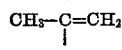

$R_4$ is H or an alkyl radical having from 1 to 2 carbon atoms, and $R_5$ is an alkyl radical having from 1 to 3 carbon atoms, at least 25% of the total weight of any of said copolymers being defined by the radical

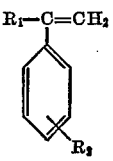

and said polymer having an intrinsic viscosity in toluene of at least about 2 dl./g. at 25° C.; and continuing said pumping until said formation is subjected to sufficient pressure to cause fracturing of said formation.

11. The method of claim 10 wherein said frictional pressure loss reducing additive is present in said hydrocarbon fracturing fluid in an amount of from about 1 pound to about 10 pounds per 1000 gallons of said fluid.

12. The method of claim 10 wherein said intrinsic viscosity of said additive is from about 2 to about 10 dl./g.

13. The method of claim 10 which is further characterized to include the step of:

intermixing said additive with said fracturing fluid so that said additive is dissolved therein prior to pumping said fracturing fluid through said conduit.

14. The method of claim 13 wherein said additive is intermixed with said hydrocarbon liquid as a concentrate, said concentrate containing up to about 10% of said additive by weight in a hydrocarbon solvent for said additive.

15. The method of claim 14 wherein said solvent is kerosene.

References Cited
UNITED STATES PATENTS

| | | | |
|---|---|---|---|
| 3,318,813 | 5/1962 | McCormick et al. | 252—59 |
| 3,563,896 | 2/1971 | Allen | 252—59 |
| 2,569,400 | 9/1951 | Butler | 252—59 |
| 2,492,173 | 12/1949 | Mysels | 137—13 |
| 3,215,154 | 11/1965 | White et al. | 252—8.55 |
| 3,654,994 | 4/1972 | Slagel et al. | 166—308 |
| 3,105,047 | 9/1963 | Miller et al. | 252—8.55 |
| 3,351,079 | 11/1967 | Gibson | 137—13 |
| 2,967,827 | 1/1961 | Bolt et al. | 252—59 X |
| 3,507,932 | 4/1970 | Morduchowitz et al. | 252—56 X |
| 3,642,636 | 2/1972 | Bacskai | 252—59 |

HERBERT B. GUYNN, Primary Examiner

U.S. Cl. X.R.

137—13; 166—308; 260—93.5